United States Patent
De Bruycker et al.

(10) Patent No.: US 6,272,219 B1
(45) Date of Patent: Aug. 7, 2001

(54) ACCESS NETWORK WITH AN INTEGRATED SPLITTER

(75) Inventors: Erwin De Bruycker, Saratoga, CA (US); Jan Erreygers, Tielt-Winge (BE)

(73) Assignee: Terayon Communications Systems, Inc., Santa Clara, CA (US)

( * ) Notice: Subject to any disclaimer, the term of this patent is extended or adjusted under 35 U.S.C. 154(b) by 0 days.

(21) Appl. No.: 09/053,099

(22) Filed: Apr. 1, 1998

(51) Int. Cl.$^7$ .................................................. H04M 11/06
(52) U.S. Cl. ........................ 379/399; 370/493; 370/535
(58) Field of Search ................................. 379/399, 402; 709/230, 233; 370/494, 264, 535, 493

(56) References Cited

U.S. PATENT DOCUMENTS

| | | | |
|---|---|---|---|
| 5,111,497 | 5/1992 | Bliven et al. | 379/27 |
| 5,410,343 | 4/1995 | Coddington et al. | |
| 5,757,803 | * 5/1998 | Russell et al. | 370/494 |
| 5,781,728 | * 7/1998 | Rybicki et al. | 709/230 |
| 5,812,786 | * 9/1998 | Seazholtz et al. | 709/233 |
| 6,026,160 | * 2/2000 | Staber et al. | 379/399 |
| 6,118,766 | * 9/2000 | Akers | 370/249 |
| 6,141,330 | * 10/2000 | Akers | 370/264 |
| 6,141,356 | * 10/2000 | Gorman | 370/493 |

FOREIGN PATENT DOCUMENTS 0 795 977A  9/1997 (EP) .

OTHER PUBLICATIONS

T. Kessler et al., "Simulation of ADSL Over ISDN on German Subscriber Line", *IEEE Communications Letters*, vol. 1, No. 5, Sep. 1, 1997, pp. 124–126.

Aware Inc., "Splitterless DMT System Design and Measurements", ITU–T Telecommunication Standardization Sector of ITU, Oct. 29, 1997, entire document.

G. T. Hawley, "System considerations for the use of xDSL technology for data access", IEEE Communications Magazine, vol. 35, No. 3, Mar. 1997, pp. 56 to 60.*

K. Sistanizadeh, "spectral compatibility of asymmetrical digital subscriber lines (ADSL) with basic rate DSLs, HDSLs, and T1 lines," Global Telecommunications Conference, 1991, vol. 3, Dec. 1991, pp. 1969 to 1973.*

* cited by examiner

*Primary Examiner*—David Hudspeth
*Assistant Examiner*—Martin Lerner

(57) ABSTRACT

The present invention provides an effective way for Telecom operators to provide ADSL service to customers who are receiving POTS service over a pair gain system or who are connected to ISDN. According to one embodiment of the invention, an ADSLNDSL (Very High Speed DSL) splitter is integrated in the remote terminal of a pair gain system or in the NT1 (Network Termination 1) of an ISDN BA (Basic Access). Therefore, no extra box on the house and no extra truck roll is required when the customer orders ADSL service. Integrating the splitter makes the telephone line upwards compatible with UADSL since UADSL can be directly connected to an analog telephone line. According to another embodiment of the invention, both the splitter and ADSUUADSL modems are integrated in the remote terminal of a pair gain system or in the NT 1 of an ISDN BA. The splitter in the telephone company location may also be integrated in the central office terminal (COT) of the pair gain system. According to a further embodiment of the invention, the UADSL signal output of an ADSL splitter in the remote terminal of a pair gain system is connected to an analog POTS port, with appropriate filtering. According to this embodiment, the UADSL signal is connected to all POTS lines coming out of a remote terminal. Connecting the UADSL output of the splitter to the POTS output eliminates the need for additional wiring in the customers house.

30 Claims, 6 Drawing Sheets

ACCESS NETWORK WITH AN INTEGRATED SPLITTER

BACKGROUND OF THE INVENTION

The invention relates generally to telecommunications, and more particularly to access network with an integrated splifter.

Telephone customers are moving in an evolutionary way to higher bandwidths, from sharing POTS (Plain Old Telephone Service) and modem on one line to dedicated analog modem line at 33.6 kbps, to dedicated analog modem line at 56 kbps, and then to ISDN BA (Basic Access). Now, ADSL (asymmetrical digital subscriber line) has been introduced, and the ADSL modems have become proven technology. ADSL refers to the two way capability of a twisted copper pair with analog to digital conversion at the subscriber end and an advanced transmission technology. Ordinary twisted pair equipped with ADSL modems can transmit movies, television, dense graphics, and very high speed data. For all its capacity, ADSL leaves POTS (Plain Old Telephone Service) undisturbed. A single ADSL line therefore offers simultaneous channels for personal computers, televisions, and telephones. With ADSL, telephone companies can connect almost every home and business to exciting new interactive broadband services. The recent announcement of the Universal ADSL has accelerated the interest in the UADSL technology and will speed up of introducing UADSL in large volume.

The ISDN and ADSL services are different. ISDN provides two voice channels or a 128 kbps data channel while ADSL is predominantly a data pipe providing an asymmetrical bandwidth of up to 9 Mbps downstream and 800 kbps upstream. An ADSL access network will be an overlay network and therefore not require the expensive and time-consuming switch upgrades that held ISDN back for so long.

The customers for ADSL most likely already have a dedicated modem line or ISDN. A large proportion of the future customers will be connected to pair gain systems in the US or to ISDN in Europe.

FIG. 1 shows a standard ADSL configuration. At a telephone company location 100, a central office terminal (COT) 2, such as a line card, provides an analog telephone line POTS. An ADSL modem 4, which receives broadband data from the Internet, for example, provides ADSL. Both the POTS and ADSL are connected to a splifter 6, which provides both the POTS and ADSL services to a customer premise 200. A splitter 8 receives the POTS and ADSL signals and separates them. The ADSL provided from splitter 8 is connected to an ADSL modem 10, which is connected to either ATM 25 (asynchronous transfer mode 25 Mbps) or Ethernet. Splitters 6 and 8 are bidirectional. In other words, splitter 8 also integrates the POTS and ADSL into a single pair of lines. The single pair of lines is connected to splitter 6, which separates it to POTS and ADSL lines and provides them to COT 2 and ADSL modem 4, respectively. In this configuration, two splitters 6 and 8 are needed, one at telephone company location 100 and the other at customer premise 200.

FIG. 2 shows a configuration of UADSL, i.e., splitterless ADSL. In this configuration, no splitter is required at customer premise 200. A UADSL modem 14 is connected in parallel with an analog telephone equipment 12. UADSL modem 14 will work simultaneously with telephone equipment 12, i.e. also during ringing, dial pulsing, etc. The bit rate of UADSL modem 14 will be significantly lower compared to full-rate ADSL, but there will still be an improvement of 20–25 times over the actually achievable bit rates with analog modems.

FIG. 3A shows a configuration of ADSL over a pair gain system. In this configuration, at telephone company location 100, COT 2 provides two pairs of POTS lines to a pair gain line card (LC) system 16, which converts the two pairs into one DSL (Digital Subscriber Line). The DSL and ADSL supplied from ADSL modem 4 are connected to splitter 18, which provides DSL and ADSL services to customer premise 200 on a single pair of lines. At customer premise 200, splitter 20 separates the DSL from the ADSL. The DSL is provided to a pair gain remote terminal (RT) 22, which provides two analog POTS lines. The ADSL is provided to ADSL modem 24, which is connected to either ATM 25 or Ethernet. Because of the difference in frequency use, remote power feeding, etc., there will always be a need for splitter 20 at customer premise 200 side with pair gain systems even with UADSL transmission. In the case of providing ADSL over ISDN BA (basic access), pair gain remote terminal 22 can also be an ISDN NT1 (network termination 1).

FIG. 3B shows a standard remote terminal 22. Connectors 1, 2 and DSL are connected to POTS 1, POTS 2, and DSL lines, respectively.

In the conventional configurations, such as shown in FIGS. 1 and 3A, an external splitter is required at customer premise 200. The external splitter is usually located in a sealed box. However, an external splitter at the customer premise means an extra box at or in the house. Furthermore, using an external splitter as a separate device involves a number of operational and administrative issues, such as ordering, provisioning, maintenance, customer service, billing, testing, etc. Thus, when a customer orders ADSL service, all these issues need to be resolved. This presents significant operational and administrative costs to Telecom operators.

Therefore, there is need for an integrated remote terminal that reduces the operational and administrative costs associated with providing ADSL services to customers.

SUMMARY OF THE INVENTION

The present invention provides an effective way for Telecom operators to provide ADSL service to customers who are receiving POTS service over a pair gain system or who are connected to ISDN.

According to one embodiment of the invention, an ADSL/DSL (Very High Speed DSL) splitter is integrated in the remote terminal of a pair gain system or in the NT1 (Network Termination 1) of an ISDN BA (Basic Access). Therefore, no extra box on the house and no extra truck roll is required when the customer orders ADSL service. Integrating the splitter makes the telephone line upwards compatible with UADSL since UADSL can be directly connected to an analog telephone line.

According to another embodiment of the invention, both the splitter and ADSUUADSL modems are integrated in the remote terminal of a pair gain system or in the NT 1 of an ISDN BA. The splifter in the telephone company location may also be integrated in the central office terminal (COT) of the pair gain system.

According to a further embodiment of the invention, the UADSL signal output of an ADSL splitter in the remote terminal of a pair gain system is connected to an analog POTS port, with appropriate filtering. According to this embodiment, the UADSL signal is connected to all POTS lines coming out of a remote terminal. Connecting the UADSL output of the splitter to the POTS output eliminates the need for additional wiring in the customers house.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF THE PREFERRED EMBODIMENTS

Figure 1:
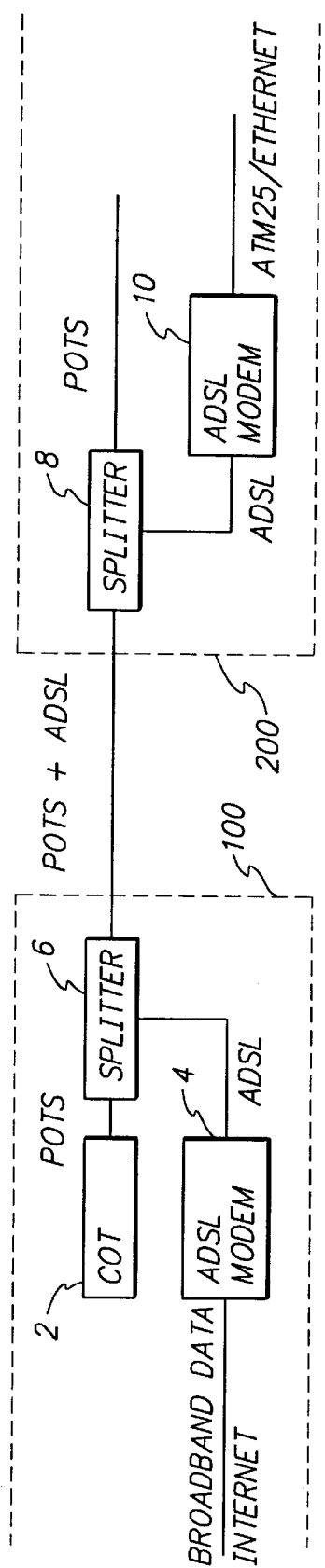
FIG. 1 shows a standard ADSL configuration.
Figure 2:
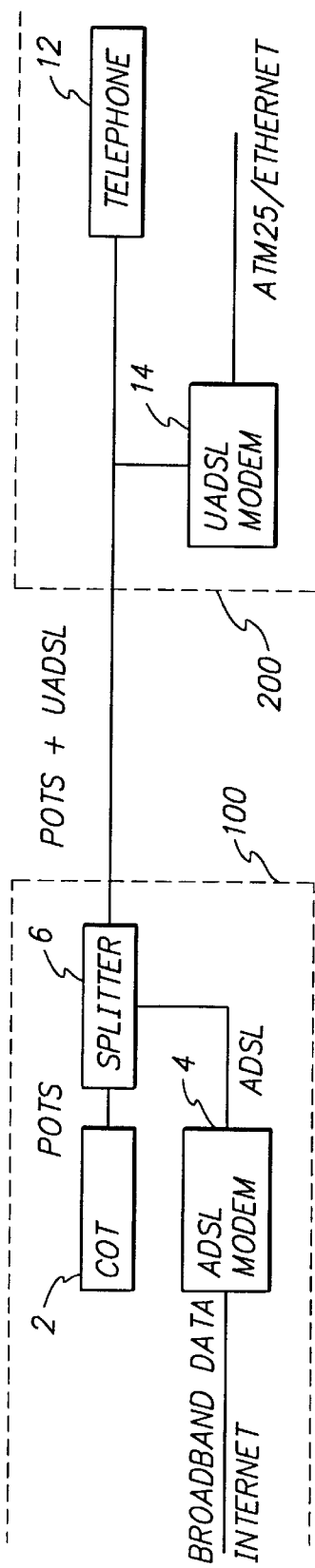
FIG. 2 shows a standard of UADSL configuration.
Figure 3A:
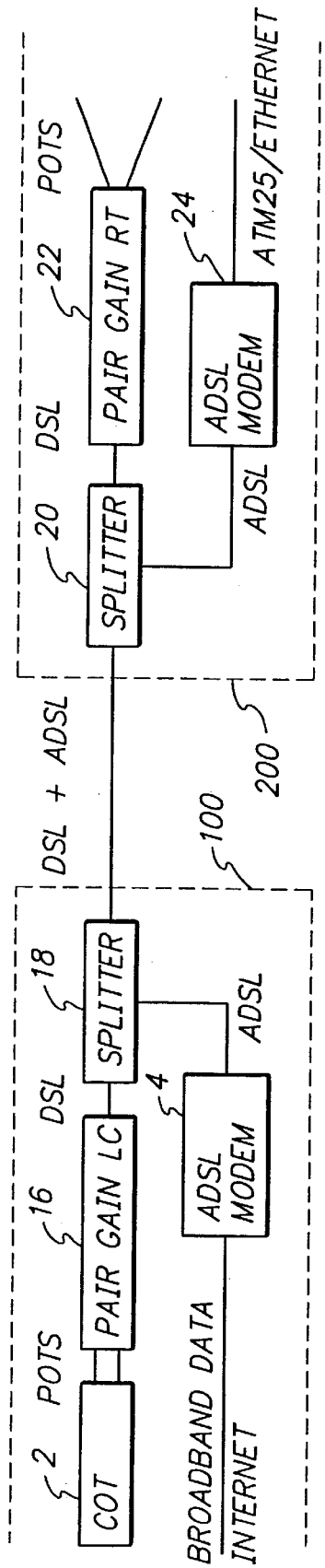
FIGS. 3A and 3B show a conventional configuration of ADSL over a pair gain system.
Figure 4A:
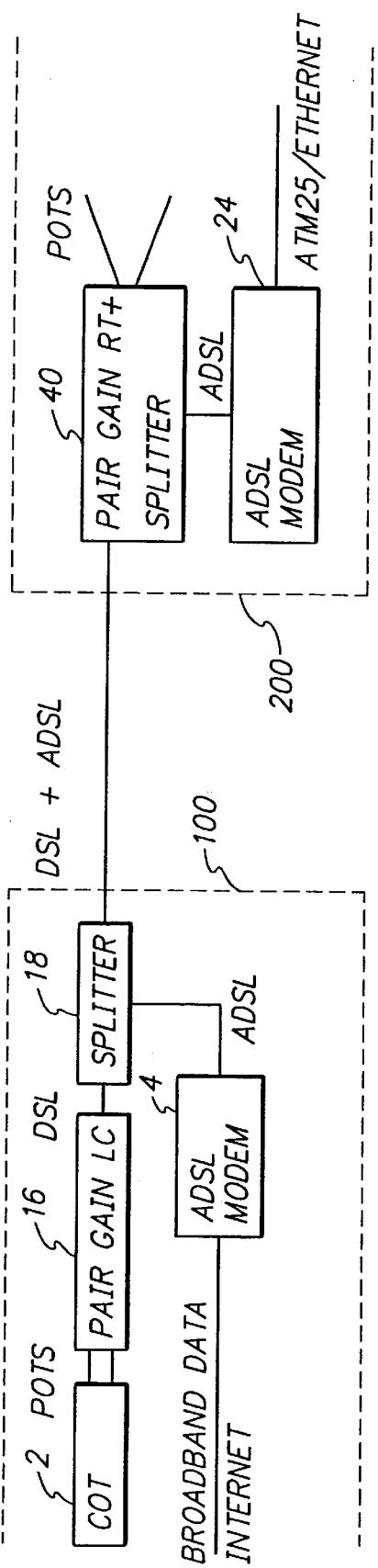
FIGS. 4A and 4B show an embodiment of ADSL over a pair gain system according to one embodiment of the invention.
Figure 3B:
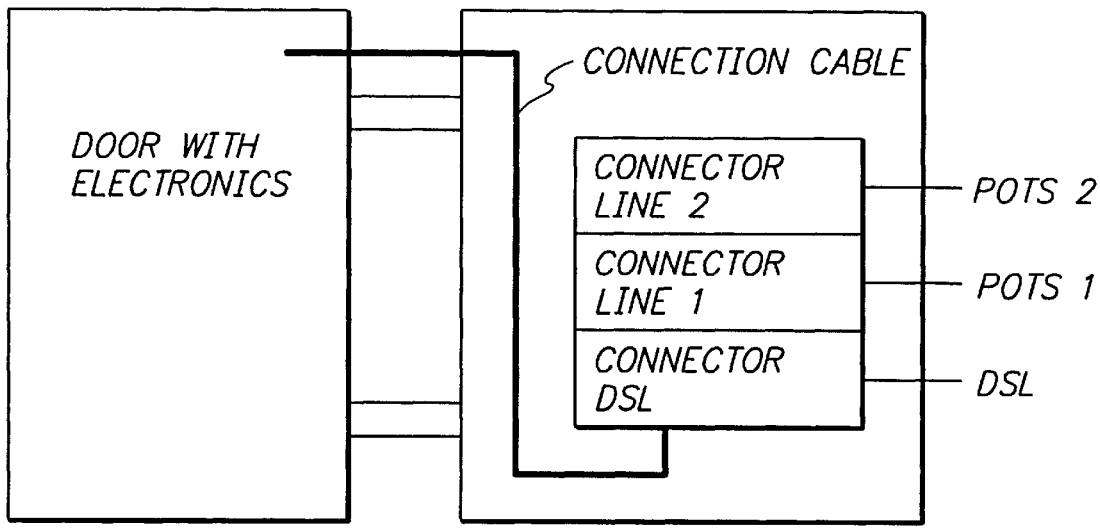

FIG. 4A shows an embodiment of ADSL over a pair gain system according to the present invention. In this embodiment, at telephone company location 100, COT 2 provides two pairs of POTS lines to a pair gain LC system 16, which converts the two pairs into one DSL (Digital Subscriber Line). The DSL and ADSL supplied from ADSL modem 4 are connected to splitter 18, which provides DSL and ADSL services to customer premise 200 on a single pair of lines.

At customer premise 200, an integrated terminal 40 is provided and connected to the DSL and ADSL pair of lines. Integrated terminal 40 comprises a pair gain remote terminal (RT) integrated with a splitter. The splitter in terminal 40 separates the DSL from the ADSL. The DSL is provided to the pair gain RT in terminal 40, which provides two analog POTS lines. The ADSL is provided to ADSL modem 24, which is connected to either ATM 25 or Ethernet. The embodiment in FIG. 4A can also be used to provide ADSL over ISDN BA (basic access). In such case, integrated terminal 40 comprises an ISDN NT1 (network termination 1) integrated with a splitter.

A splitter that may be used in the invention typically comprises a low pass filter for connecting to DSL line and a high pass filter for connecting to ADSL line. The low pass filter should allow 2B1Q or 4B3T signals to pass to the pair gain terminal and block ADSL signal. The high pass filter should at least allow ADSL signal to pass to the ADSL modem. As an example, the low pass filter may have a frequency spectrum of 80 to 120 kHz. 2B1Q signal is near the low end of the frequency spectrum, while 4B3T signal is near the high end of the frequency spectrum. The high pass filter may have a frequency spectrum of 100 to 140 kHz.

There are several ways to implement the integration of the splitter in terminal 40. One way is to include the splitter on a printed circuit board (PCB) with the pair gain electronics. This is an economical solution if a new design is made. Because of the large volumes, the cost will be low. These systems become ADSL compatible.

Another way is the integration of the splitter in a connector module for copper twisted pair, e.g. in an MSP (modular single protector) product, manufactured by Raychem Corporation, Menlo Park, Calif. This provides a lot of flexibility. The ADSL splitter can be installed in the field as opposed to factory pre-installation and an additional connector module, such as another Raychem's MSP, for the ADSL signal can be provided. An advantage is that this solution provides the Telecom operators a very easy way to upgrade existing pair gain systems to ADSL compatible system. The existing connector (e.g., 125 AW) for copper twisted pair can be removed and replaced by, for example, a sealed MSP including the splitter. An extra MSP can be mounted for the ADSL data line to connect the twisted pair to the ADSL modem.

Figure 4B:
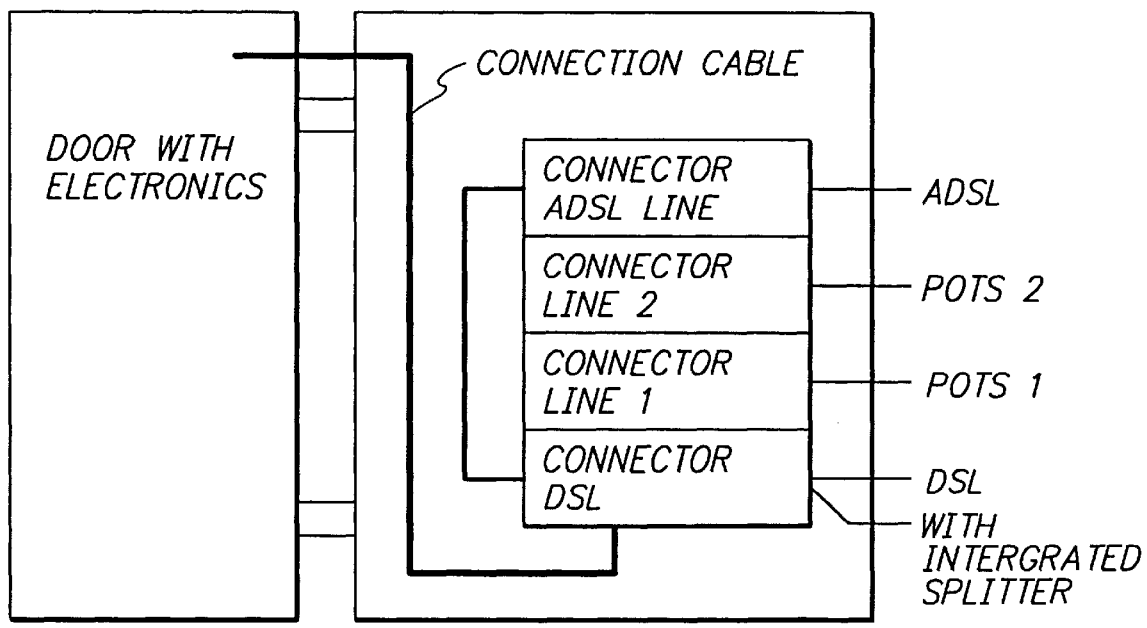

FIG. 4B shows an example of a remote terminal 40 according to the invention. Connectors 1, 2, ADSL and DSL are connected to POTS1, POTS 2, ADSL and DSL lines, respectively.

The above ways of implementing the integration of the splitter also applies when an ISDN NT1 is used in terminal 40 in an ISDN BA system.

Thus, the following benefits can be obtained from the present invention. The cost is reduced because only one box is needed. In the box, the splitter and the pair gain RT electronics are integrated on one printed circuit board. Furthermore, less space is needed at customer premise 200. Also, if this embodiment of the invention is implemented as standard in all remote terminals, Telecom operators can save a truck roll when a customer orders ADSL service because the integrated terminal is already capable of providing the service.

Figure 5:
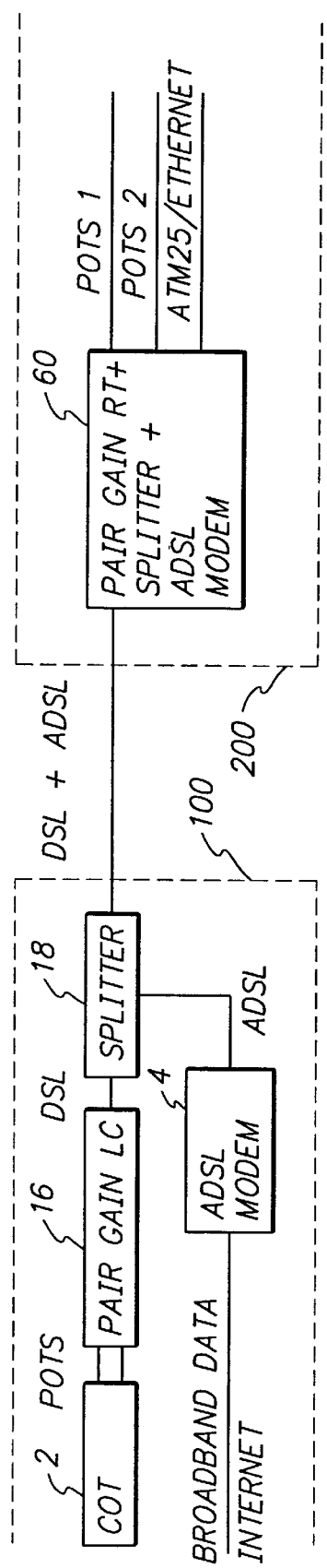
FIG. 5 shows a variation of the embodiment in FIG. 4A according to the invention.

Depending on the regulatory environment, the ADSL modem at customer premise 200 can also be integrated with the pair gain RT (or ISDN NT1) and the splitter. FIG. 5 shows such an embodiment according to the present invention. In FIG. 5, an integrated terminal 60 comprises a pair gain RT (or ISDN NT1) integrated with a splitter and an ADSL modem.

According to the present invention, the splitter at telephone company location 100 may also be integrated with the pair gain line card or backplane of the pair gain shelf. There are several ways to implement the integration. One way is to provide a separate splitter shelf in the central office. Another way is to mount the splitters on the main distribution frame (MDF) in the central office.

Figure 6:
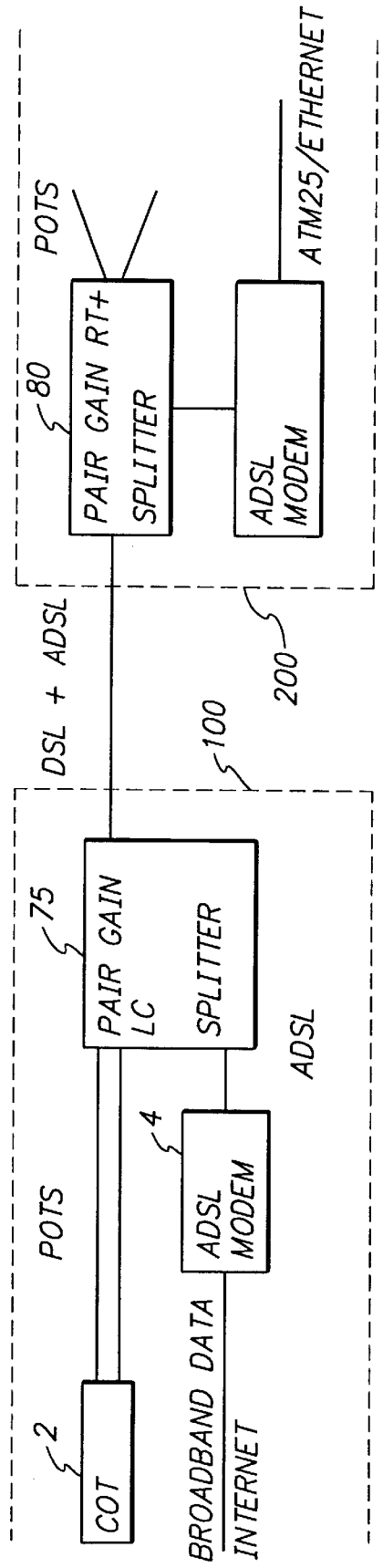
FIG. 6 shows another embodiment of the invention in which the splitter at the telephone company location is integrated with the central office terminal.

For pair gain systems, It can be attractive to integrate the splitter with the COT (Central Office Terminal) of the pair gain system, as illustrated by integrated terminal 75 in FIG. 6. It reduces the cost and makes the system compatible with future services. For example, the Raychem Miniplex® system has a lot of flexibility because of the approach with the universal shelf. For two channel systems spare connections are already available.

In the embodiment shown in FIG. 6, the splitter may be mounted on the pair gain line card for a universal application. Alternatively, the splitter can be mounted on the backplane. For example, a splitter module may be mounted individually on wire-wrap pins, or a piggy-back board with splitters mounted thereon may be provided. Alternatively, integrating splitters in the DSL connector for the connectorized shelf, i.e., a shelf that has pre-equipped connectors.

Figure 7:
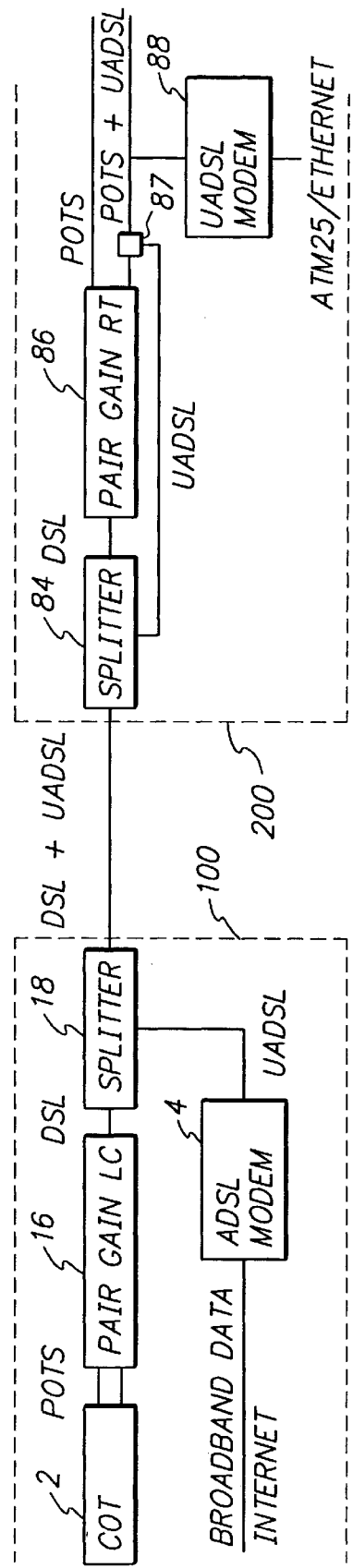
FIG. 7 shows how UADSL can work with pair gain systems according to the invention.

FIG. 7 shows how UADSL can work with pair gain systems. This embodiment provides the UADSL on one POTS line. As shown in FIG. 7, a splitter 84 separates the DSL from the UADSL. The DSL is provided to a pair gain RT 86 which provides two analog POTS lines. The UADSL is combined with one of the two POTS lines so that a combined POTS+UADSL is provided. ADSL modem 88 is connected to the POTS+UADSL line. A connector module 87 for copper twisted pair is used to connect the UADSL line to the POTS+UADSL line in FIG. 7. In FIG. 7, splitter 84 and pair gain RT 86 may be integrated. Also, by using appropriate high pass filters, the UADSL can be offered on multiple POTS pairs coming out of pair gain RT 86, as will be described below in connection with FIG. 8A.

Figure 8A:
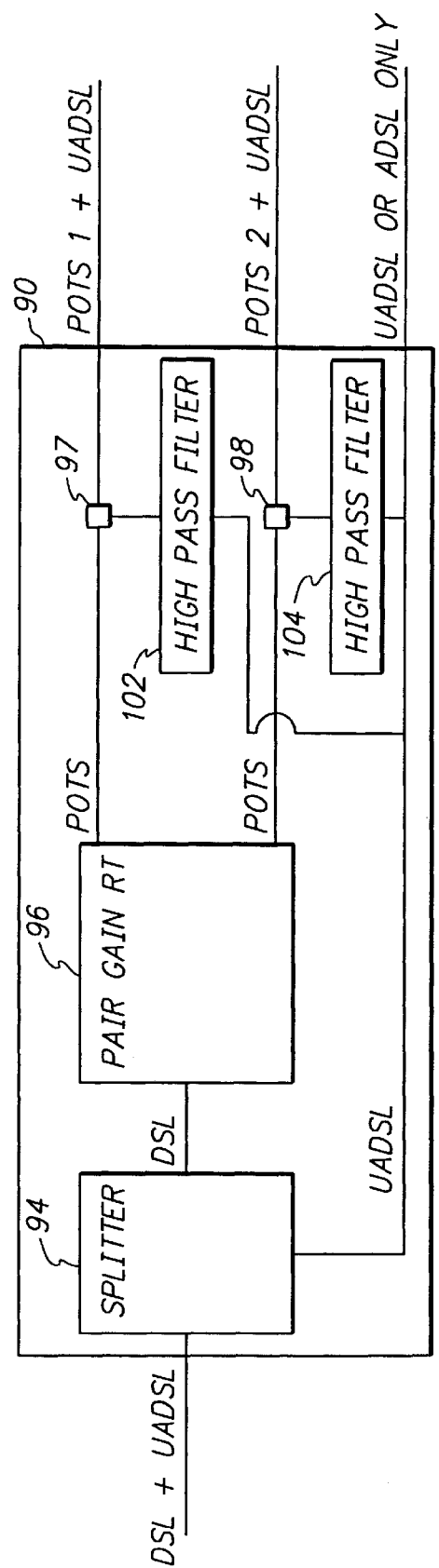
FIGS. 8A and 8B show still another embodiment according to the invention.

FIG. 8A shows the block diagram of an integrated pair gain system RT 90, including a splitter 94. This embodiment provides UADSL on all the lines in a house. In FIG. 8A, splitter 94 and pair gain RT 96 are integrated as described above. The UADSL from splitter 94 is connected to both outgoing pairs of POTS through high pass filter 102, connector module 97 and high pass filter 104, connector module 98, respectively. High pass filters 102 and 104 assure the quality of the voice frequency (VF) transmission in each POTS line. The high pass filters are required for the simultaneous connection of UADSL on both POTS pairs. This provides a significant reduction of the complexity of managing the wiring in the house. In this way, someone who has two telephone lines may receive the UADSL signal on both lines. With this configuration, the in-house wiring behaves as two different pairs in the voice band and as one twisted pair network for the UADSL signal.

In the embodiment of FIG. 8A, a separate output for a high-frequency signal is also provided. This output can be used for UADSL or ADSL. If a customer initially chooses the UADSL service, he or she can later upgrade the service to the full-rate ADSL service. Also, by connecting a UADSL modem to the UADSL or the ADSL only signal, the performance is likely to be much better than either POTS1+UADSL or POTS2+UADSL signal on the separate pair for the UADSL signal in the house.

Figure 8B:
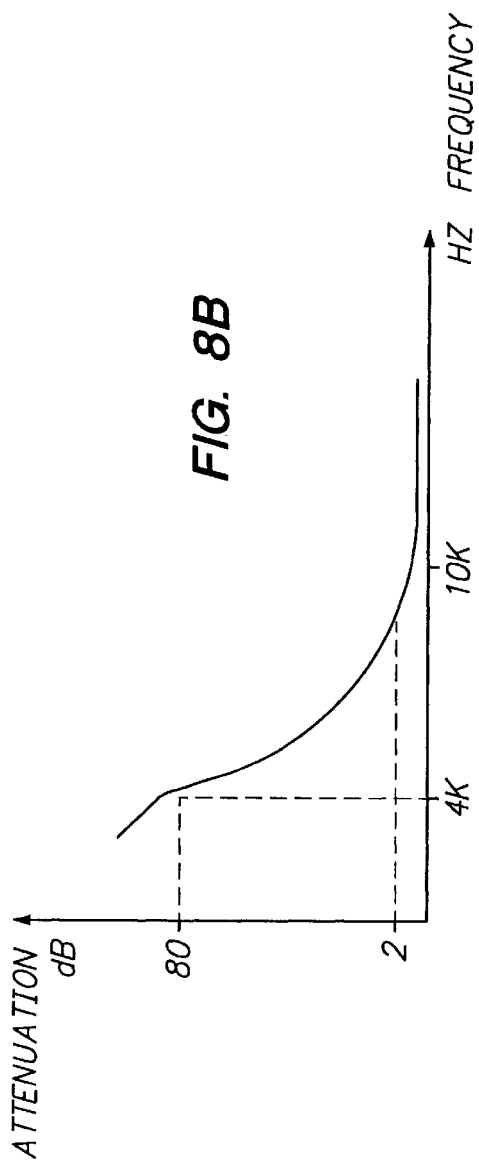

In FIG. 8A, high pass filters 102 and 104 need to be at least 65 dB attenuation in the 300 Hz to 4 kHz frequency band, in order to meet the minimum specification for avoiding cross-talk between the POTS lines. Preferably the attenuation should be higher, such as 70 dB or 75 dB. An attenuation of 80 dB in the voice band would give near perfect performance in the voice frequency band. FIG. 8B shows the characteristics of the high pass filters, as an example. At minimum a third order filter would be required. A fourth order filter should preferably be used.

Figure 9:
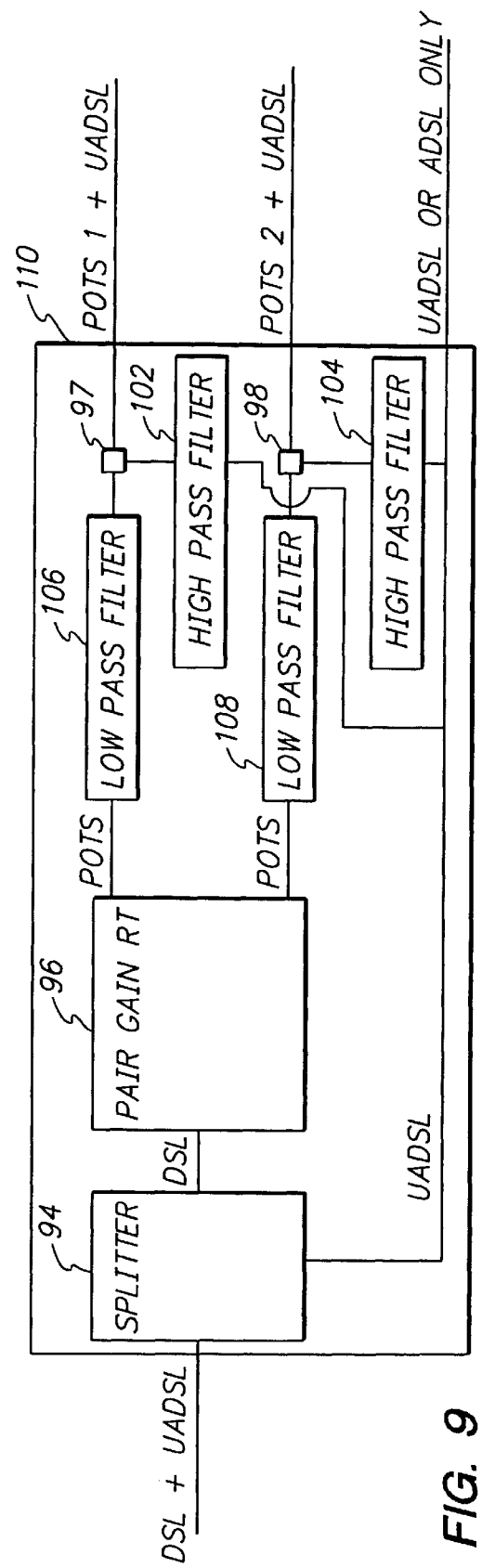
FIG. 9 shows a variation of the embodiment in FIG. 8A according to the invention.

FIG. 9 shows a variation of the embodiment illustrated in FIG. 8A. In FIG. 7, low pass filters 106 and 108 are provided at the analog POTS lines. Low pass filters 106 and 108 help reduce possible interference caused by the signal on the electronics in pair gain RT 96.

In FIGS. 8A and 9, connection of the UADSL to both POTS lines can also be implemented by integrating the appropriate low and high pass filters in connector modules for copper twisted pair, such as Raychem's MSP product. This will provide a way to upgrade existing remote terminals to UADSL on both POTS lines.

A range of splitters may be used to adapt to a range of different pair gain systems with two, four, or six channels, for example, which use different bit rates on the DSL.

As a corollary we need an ADSL modem that will automatically adapt itself to the conditions on the line. ADSL over ISDN has been demonstrated by moving the ADSL DMT (direct multi-tone transmission technique) frequency spectrum higher up. The bit rate or distance performance was 10% less than for ADSL over POTS. Currently, 6 or 8 Mbps is too much for the actual applications. Therefore, Telecom operators will be very willing to compromise on the bit rate for compatibility with existing other services. For example, for UADSL, 500 kbps or 1 Mbps is quoted.

The standard rate adaptivity of ADSL modems can be extended. In standard ADSL the modems are checking the attenuation which goes down for the higher frequencies. If splitters with a higher cut-off frequency are installed on the line, the ADSL modem is able to recognize them by measuring the attenuation at the lower end of the frequency spectrum. After identification of the splitter, the modem can switch to the appropriate mode and rearrange the bit allocation on the DMT channels to accommodate with the available bandwidth for downstream and upstream transmission.

Also, bit compression in the voice channels have been used to optimize the ADSL data rate. Technologies for reducing the bandwidth requirements for voice frequency channels are widely known: e.g. ADPCM (adaptive differential pulse code modulation) G.726 compression reduces the bit rate from 64 kbps (PCM) to 32 and 16 kbps. In the US and Western is Europe, the use of these technologies in the access network has not been allowed because it compromises the performance of high speed analog modems (V.34). A 4-channel pair gain system (e.g. Miniplex 4N1) uses a lot more of the frequency spectrum than a 2-channel system (up to 144 kHz versus up to 80 kHz). The low end of the frequency spectrum is also the most efficient for ADSL transmission as the attenuation of the twisted pair increases with frequency.

If in the future all data transmission will be done over ADSL, then the requirement for 64 kbps transmission of voice channels may be relaxed and ADPCM compression may be allowed. Using ADPCM a 4-voice channel system only needs the 2-channel bandwidth on the DSL (e.g. Miniplex® ADPCM-4 system). This will leave more spectrum available for the ADSL signal and therefore a higher bit rate or longer reach. This concept gives the Telecom operator more freedom in making trade-offs between the quality of different services on the same copper pair, i.e., between voice and data.

Telecom operators prefer to introduce new services that are compatible with existing services. The ideas presented above show how ADSL can be introduced in the network and work together with pair gain systems. For ADSL over ISDN, the same solutions are required as for ADSL over pair gain.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An apparatus for communicating with a telephone company location which includes a pair gain system and provides combined digital subscriber line (DSL) and asymmetrical digital subscriber line (ADSL) signals, the apparatus comprising:

a splitter for separating the combined DSL and ADSL signals received from the telephone company location into a DSL signal and an ADSL signal; and a pair gain remote terminal connected to said splitter for receiving from and sending to said splitter a DSL signal;

wherein said splitter is integrated with said remote terminal.

2. The apparatus of claim 1 wherein said splitter receives a DSL signal from said remote terminal and an ADSL signal from an ADSL modem and combines the DSL and ADSL signals for sending to the telephone company location.

3. The apparatus of claim 1 wherein said splitter includes:

a DSL line for receiving and sending a DSL signal;

an ADSL line for receiving and sending an ADSL signal;

a low pass filter connected to said DSL line for filtering signals to be sent and received on said DSL line; and a high pass filter connected to said ADSL line for filtering signals to be sent and received on said ADSL line.

4. The apparatus of claim 3 wherein:

said low pass filter has a cutoff frequency of 80 to 120 kHz; and said high pass filter has a cutoff frequency of 100 to 140 kHz.

5. The apparatus of claim 1 wherein said remote terminal includes a printed circuit board (PCB) and said splitter is mounted on said PCB for integration with said remote terminal.

6. The apparatus of claim 1, further comprising an ADSL modem connected to said splitter and integrated with said remote terminal.

7. An apparatus for communicating with a telephone company location which includes an ISDN system and provides combined digital subscriber line (DSL) and asymmetrical digital subscriber line (ADSL) signals, the apparatus comprising:

a splitter for separating the combined DSL and ADSL signals received from the telephone company location into a DSL signal and an ADSL signal; and an ISDN network termination (NT) unit connected to said splitter for receiving from and sending to said splitter a DSL signal;

wherein said splitter is integrated with said ISDN NT unit.

8. The apparatus of claim 7 wherein said splitter receives a DSL signal from said ISDN NT unit and an ADSL signal from an ADSL modem and combines the DSL and ADSL signals for sending to the telephone company location.

9. The apparatus of claim 7 wherein said splitter includes:

a DSL line for receiving and sending a DSL signal;

an ADSL line for receiving and sending an ADSL signal;

a low pass filter connected to said DSL line for filtering signals to be sent and received on said DSL line; and a high pass filter connected to said ADSL line for filtering signals to be sent and received on said ADSL line.

10. The apparatus of claim 9 wherein:

said low pass filter has a cutoff frequency of 80 to 120 kHz; and said high pass filter has a cutoff frequency of 100 to 140 kHz.

11. The apparatus of claim 7 wherein said ISDN NT unit includes a printed circuit board (PCB) and said splitter is connected to said PCB for integration with said ISDN NT.

12. The apparatus of claim 7, further comprising an ADSL modem connected to said splitter and integrated with said ISDN NT unit.

13. An apparatus for use in a telephone company location which provides combined digital subscriber line (DSL) and asymmetrical digital subscriber line (ADSL) signals for communicating with a pair gain remote terminal, the apparatus comprising:

a splitter for separating the combined DSL and ADSL signals received from the remote terminal into a DSL signal and an ADSL signal; and a pair gain system connected to said splitter for receiving from and sending to said splitter a DSL signal;

wherein said splitter is integrated with said pair gain system.

14. The apparatus of claim 13 wherein said splitter receives a DSL signal from said pair gain system and an ADSL signal from an ADSL modem and combines the DSL and ADSL signals for sending to the remote terminal.

15. The apparatus of claim 13 wherein said splitter includes:

a DSL line for receiving and sending a DSL signal;

an ADSL line for receiving and sending an ADSL signal;

a low pass filter connected to said DSL line for filtering signals to be sent and received on said DSL line; and a high pass filter connected to said ADSL line for filtering signals to be sent and received on said ADSL line.

16. The apparatus of claim 15 wherein:

said low pass filter has a cutoff frequency of 80 to 120 kHz; and said high pass filter has a cutoff frequency of 100 to 140 kHz.

17. The apparatus of claim 13, wherein said pair gain system includes a line card and said splitter is mounted on said line card for integration with said pair gain system.

18. The apparatus of claim 13 wherein said pair gain system includes a backplane and said splitter is mounted on said backplane for integration with said pair gain system.

19. An apparatus for communicating with a telephone company location which includes a pair gain system and provides combined digital subscriber line (DSL) and universal asymmetrical digital subscriber line (UADSL) signals, the apparatus comprising:

a splitter for separating the combined DSL and UADSL signals received from the telephone company location into a DSL signal and a UADSL signal, said splitter including a DSL line for receiving and sending a DSL signal and a UADSL line for receiving and sending a UADSL signal;

a pair gain remote terminal connected to said splitter for receiving from and sending to said splitter a DSL signal, said remote terminal including a plurality of lines for receiving and sending analog signals; and a connector module connected to the UADSL line of said splitter and one of the plurality of lines of said remote terminal, said connector module including a combined signal line for sending and receiving combined UADSL and analog signals;

wherein said splitter is integrated with said remote terminal.

20. The apparatus of claim 19 wherein said splitter receives a DSL signal from said remote terminal and a UADSL signal from said connector module and combines the DSL and UADSL signals for sending to the telephone company location.

21. The apparatus of claim 19 wherein said splitter further includes:

a low pass filter connected to said DSL line for filtering signals to be sent and received on said DSL line; and a high pass filter connected to said UADSL line for filtering signals to be sent and received on said UADSL line.

22. The apparatus of claim 21 wherein:

said low pass filter has a cutoff frequency of 80 to 120 kHz; and said high pass filter has a cutoff frequency of 100 to 140 kHz.

23. The apparatus of claim 19 wherein said remote terminal includes a printed circuit board (PCB) and said splitter is mounted on said PCB for integration with said remote terminal.

24. An apparatus for communicating with a telephone company location which includes a pair gain system and provides combined digital subscriber line (DSL) and universal asymmetrical digital subscriber line (UADSL) signals, the apparatus comprising:

a splitter for separating combined DSL and UADSL signals received from the telephone company location into a DSL signal and a UADSL signal, said splitter including a DSL line for receiving and sending a DSL signal and a UADSL line for receiving and sending a UADSL signal;

a pair gain remote terminal connected to said splitter for receiving from and sending to said splitter a DSL signal, said remote terminal including a plurality of lines for receiving and sending analog signals;

a plurality of filters each coupled to the UADSL line of said splitter; and a plurality of connector modules each coupled to one of said plurality of filters and one of the plurality of lines of said remote terminal, each of said plurality of connector modules including a combined signal line for sending and receiving combined UADSL and analog signals;

wherein said splitter is integrated with said remote terminal.

25. The apparatus of claim 24 wherein said splitter receives a DSL signal from said remote terminal and a UADSL signal from one of said plurality of connector modules and combines the DSL and ADSL signals for sending to the telephone company location.

26. The apparatus of claim 24 wherein each of said plurality of filters is a high pass filter having at least 65 dB attenuation in a frequency band of 300 Hz to 4 kHz.

27. The apparatus of claim 26, further comprising a plurality of low pass filters each connected between one of the plurality of lines of said remote terminal and one of said plurality of connector modules.

28. The apparatus of claim 24 wherein said splitter further includes:

a low pass filter connected to said DSL line for filtering signals to be sent and received on said DSL line; and a high pass filter connected to said UADSL line for filtering signals to be sent and received on said UADSL line.

29. The apparatus of claim 24 wherein:

said low pass filter has a cutoff frequency of 80 to 120 kHz; and said high pass filter has a cutoff frequency of 100 to 140 kHz.

30. The apparatus of claim 24 wherein said remote terminal includes a printed circuit board (PCB) and said splitter is mounted on said PCB for integration with said remote terminal.

* * * * *